United States Patent
Watanabe

(10) Patent No.: US 6,219,664 B1
(45) Date of Patent: Apr. 17, 2001

(54) SEARCH METHOD AND SYSTEM USING SYNTACTIC INFORMATION

(75) Inventor: Hideo Watanabe, Machida (JP)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/384,124

(22) Filed: Aug. 27, 1999

(30) Foreign Application Priority Data

Aug. 31, 1998 (JP) .................................................. 10-245050

(51) Int. Cl.[7] .................................................. G06F 17/30
(52) U.S. Cl. ........................ 707/3; 707/2; 707/5; 707/10
(58) Field of Search ................. 707/3, 5, 2, 10

(56) References Cited

U.S. PATENT DOCUMENTS

| | | | |
|---|---|---|---|
| 5,123,103 | * 6/1992 | Ohtaki et al. | 707/3 |
| 5,642,502 | * 6/1997 | Driscoll | 707/5 |
| 5,684,999 | * 11/1997 | Okamoto | 704/9 |
| 5,761,496 | * 6/1998 | Hattori | 707/5 |
| 5,873,056 | * 2/1999 | Liddy et al. | 704/9 |
| 5,893,091 | * 4/1999 | Hunt et al. | 707/3 |
| 5,893,092 | * 4/1999 | Driscoll | 707/5 |
| 5,907,836 | * 5/1999 | Sumita et al. | 707/2 |
| 5,911,139 | * 6/1999 | Jain et al. | 707/3 |
| 5,933,822 | * 8/1999 | Braden-Harder et al. | 707/5 |
| 5,983,221 | * 11/1999 | Christy | 707/5 |
| 5,991,755 | * 11/1999 | Noguchi et al. | 707/3 |

* cited by examiner

Primary Examiner—Hosain T. Alam
Assistant Examiner—Jean M. Corrielus
(74) Attorney, Agent, or Firm—David M. Shofi; Kevin M. Jordan; Anne Vachon Dougherty

(57) ABSTRACT

A search request is syntactically analyzed, and location constraint data for keywords and function words (FNWORD) are extracted that constitute partial-order relationships. A document, which is to be retrieved and for which no syntactic analysis is required, is searched for that contains a sentence that matches the partial-order relationship. In the search for the document containing the sentence that matches the partial-order relationship, a sentence having a short context that matches the partial-order relationship is regarded as a sentence that has a higher similarity.

12 Claims, 3 Drawing Sheets

SEARCH METHOD AND SYSTEM USING SYNTACTIC INFORMATION

FIELD OF THE INVENTION

This invention relates to a search method and system employing syntactic information, and in particular to a method and system for parsing/analyzing a sentence upon receiving a search request, and for searching through a document.

BACKGROUND OF THE INVENTION

Search systems that are currently in use on the World Wide Web (WWW) are either keyword search types or full-text search types. Since with such systems a very large number of search results are obtained, a great deal of effort must be expended before a target document for a user can be located. In attempts to resolve this problem, various corrective methods have been employed. According to one of them, a search request is submitted in the form of a sentence, not the logical product or the logical sum of several keywords, and a search is made using a sentence that resembles the sentence used to request the search. Technically, this method can be broken down into the following sub-methods:

(1) A vector space model method
(2) A keyword location constraint matching method
(3) A sentence matching method The vector space model method (1) ("Automatic Text Processing: the transformation, analysis and retrieval of information by computer," Salton G., Addison-Wesley Publishing, 1989) is a method whereby a document and a search request are respectively regarded as vectors, with their keywords acting as axes; and similarity is calculated by using the distance between the vectors. However, since with this method it is merely assumed that a keyword in a search request has appeared independently, this method can not be used to cope with a situation wherein a keyword in a search request just happens to be included in a large document.

The keyword location constraint matching method (2) ("Fast Method for Obtaining a Similarity for a Long Japanese Expression," Hideki Tanaka, reference material for the Language Processing Research Group of the Information Processing Institute, NLWG121-10, 1997) is a method for extracting keywords from a search request, and for defining, as matching, those keywords that satisfy a total-order relationship concerning the locations at which the keywords appear. This method is superior to method (1), but is inferior to method (3), in that only the locations of the keywords are used as constraints.

Method (3) is one for analyzing a search request and a document and for obtaining a match at a syntactic tree level. Although this appears to be an ideal method, the accuracy and the speed that are attained with it are unsatisfactory for syntactic analysis. Therefore, it is not widely employed.

It is therefore one object of the present invention to provide a search method and system for maintaining a balance between the accuracy and the speed attained during syntactic analysis.

It is another object of the present invention to provide a method and a system for performing an efficient network search.

It is an additional object of the present invention to provide a search method and system that does not syntactically analyze a document to be retrieved.

It is a further object of the present invention to provide a search method and system for the employment of location constraint data in a search request sentence.

SUMMARY OF THE INVENTION

To achieve the above objects, first, a search request is syntactically analyzed, and location constraint data for keywords and function words (FNWORD) are extracted that constitute partial-order relationships. A document, which is to be retrieved and for which no syntactic analysis is required, is sought that contains a sentence matching the partial-order relationship. In the search for the document containing the sentence that matches the partial-order relationship, a sentence having a short context that matches the partial-order relationship is regarded as a sentence that has a higher similarity. With this arrangement, when compared with the matching method (2) of the keyword location constraint to type, data providing more detailed location constraints can be extracted by employing syntactic analysis. In addition, when a comparison is made using the syntactic matching method (3), the problems of poor matching accuracy and low speed, which occur as the result of an incomplete syntactic analysis, can be resolved because a document to be retrieved is not syntactically analyzed.

FIG. 1 is a fundamental flowchart showing a search method according to the present invention. At step 110 a search request is syntactically analyzed, and at step 120 location constraint data (partial-order relationships) are extracted from the results of the analysis. Finally, at step 130 a sentence that matches the location constraint data (partial-order relationships) is obtained from a document to be retrieved.

With a search request QS, syntactic analysis tree QT is generally represented as follows.

Expression 1

QT=TREE
TREE=(WORD)|(CHILD+HEAD CHILD*)|(CHILD* HEAD CHILD+)
HEAD=('HEAD' TREE)
CHILD=(FUNC TREE)|(TREE FUNC)
FUNC='FN' WORD where FUNC represents an existing modification relationship between HEAD and TREE. An example analysis tree for a search request is represented as follows.

Expression 2

"XXX sha no YYY sha heno teiso"
(((XXX sha)FN no)((YYY sha)FN heno)(HEAD(teiso)))
"lawsuit of XXXCO. to YYYCo."
(((HEAD(lawsuit))(FN of (XXXCo.))(FN to (YYYCo.)))

From the above syntactic analysis tree, location data existing between HEAD and CHILD are employed as location constraint data. The extracted location constraint data are represented as follows.

order constraint . . . The positional relationship between CHILD and HEAD must be maintained. For example, when HEAD is located after CHILD, the relationship should be described as CHILD→HEAD.

neighbor-order constraint . . . A HEAD word and an FN word in a NODE must be neighbors, while their positional relationship is maintained. Being neighbors means that these words are located within a distance delineated by a count of words that is equivalent to a numeral provided as a parameter. For example, when FNWORD is in the neighborhood that follows the NODE, the positional relationship is described by NODE→FNWORD.

Therefore, the following location constraint data are obtained from the above example Japanese sentence.

Expression 3
XXX sha→teiso
YYY sha→teiso
XXX sha→no
YYY sha→heno

Also, the following location constraint data are obtained from the example English sentence.

Equation 4
lawsuit→XXXCo.
lawsuit→YYYCo.
of→XXXCo.
to→YYYCo.

These location constraint data are employed for the search.

It should be noted, however, that the matching similarity is higher for a group having a shorter context that satisfies the constraint data, such as a paragraph that consists of two sentences rather than a single sentence.

When compared with the vector space model in background art (1), it is apparent that, as well as the matching method (2) which uses keyword location constraints, the method of the present invention is superior in the employment of the location constraints associated with keywords. In addition, when compared with the syntactic matching method (3), the method of the invention is superior in that, since a document to be retrieved is not syntactically analyzed, the problems of incomplete syntactic analysis and low speeds for the matching of syntactic trees can be resolved. When compared with the matching method (2), which uses the keyword location constraints, a more flexible search can be performed by using location constraint data that are selected from a correlation of the syntactic trees. For example, when six keywords, A, B, C, D, E and F are present in the named order and form the following syntactic tree, Expression 5
search request: A . . . B . . . C . . . D . . . E . . . F
syntactic tree: ((FN $fn_1$((FN $fn_2$(A))(HEAD(B))))
(FN $fn_3$((FN $fn_4$(C)(FN $fn_5$(D))(HEAD(E))))
(HEAD(F)))
document 1: . . . A . . . B . . . C . . . D . . . E . . . F . . .
document 2: . . . A . . . B . . . C . . . D . . . E . . . F . . .
document 3: . . . C . . . D . . . E . . . A . . . B . . . F . . .
document 4: . . . D . . . C . . . E . . . A . . . B . . . F . . .
,
according to the matching method (2), which is a keyword location constraint type, the keywords match only document 1, while according to the method of the present invention, the keywords can match all the variations extending from document 1 to document 4. According to the matching performed using this method, if several elements modify a specific HEAD in an arbitrary order, the matching succeeds. That is, while according to the matching method (2), which is a keyword location constraint type, the location constraint for words is employed as a total-order relationship, while according to the method of the present invention, the location constraint is employed as a partial-order relationship that is obtained from the syntactic structure. In addition, since function words are employed for the present invention, the search range can be compressed, compared with the matching method (2). Therefore, while taking the above description into account, a more accurate search can be performed than that which is performed by the matching method (2), which is a keyword location constraint type.

BRIEF DESCRIPTION OF THE DRAWINGS

The invention will hereinafter be described in greater detail with specific reference to the appended drawings wherein.

DESCRIPTION OF THE PREFERRED EMBODIMENT

Figure 1:
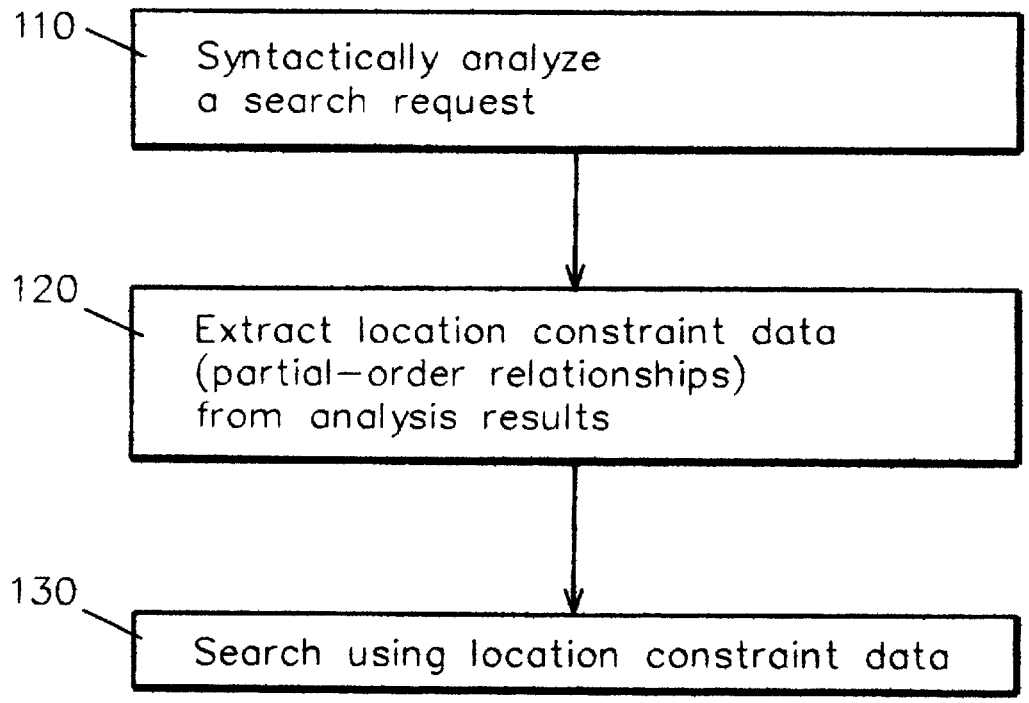
FIG. 1 is a basic flowchart showing a search method according to the present invention.
Figure 2:
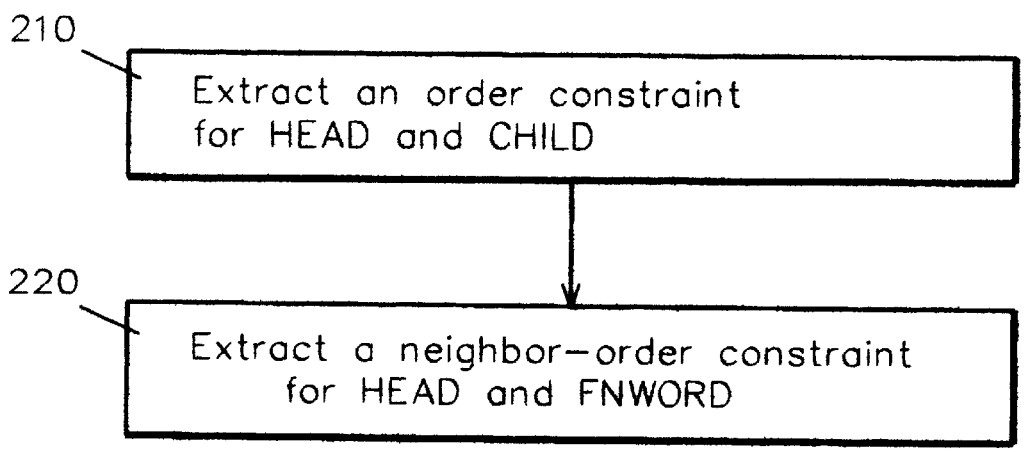
FIG. 2 is a flowchart showing the extraction of the partial-order relationship from location constraint data.
Figure 4:
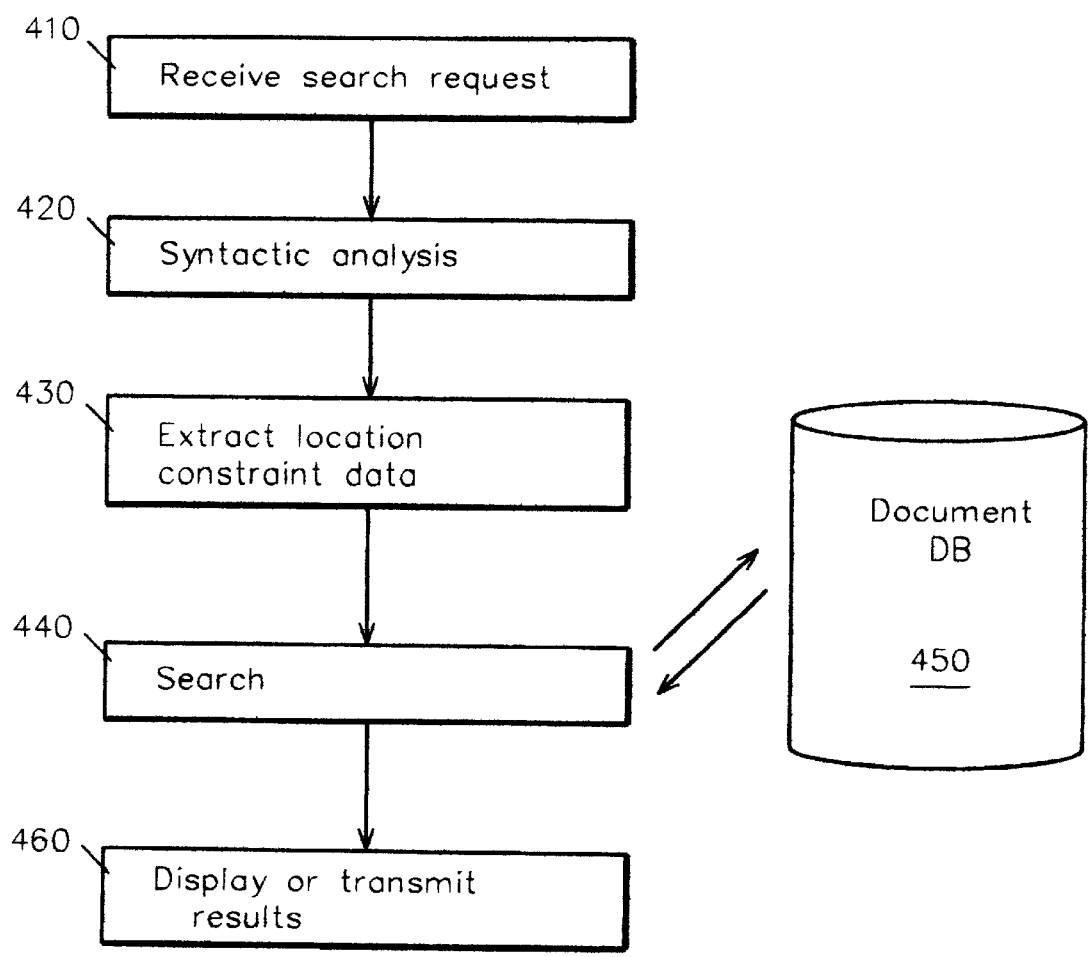
FIG. 4 is a flowchart for the search system employed on a network according to the present invention.

An explanation will now be given for the preferred embodiment in which the method of the present invention is applied for a search system employed on a network. While a large quantity of search results can be provided by an Internet search, the network search system of the present invention can perform a search while balancing accuracy and syntactic analysis speeds. FIG. 4 is a flowchart showing the processing performed by the network search system of the present invention. First, at step 410 a search request sentence is received from a network. At step 420 the search request sentence is analyzed syntactically. At step 430 location constraint data are extracted from a syntactic analysis tree obtained by the analysis. As is shown in FIG. 2, the location constraint data are obtained by extracting the order constraint for HEAD and CHILD and by extracting the neighbor-order constraint for HEAD and FNWORD. This is called a partial-order relationship.

Program control then moves to step 440 in FIG. 4, whereat the obtained location constraint data (the partial-order relationship) are employed to search a document database 450. To obtain from a document to be retrieved a sentence that matches the partial-order relationship, a sentence having a short context that matches the partial-order relationship is regarded as a sentence having a higher similarity. At step 460 the results of the search are transmitted to a search requesting source. The results may be displayed at this time.

Figure 3:
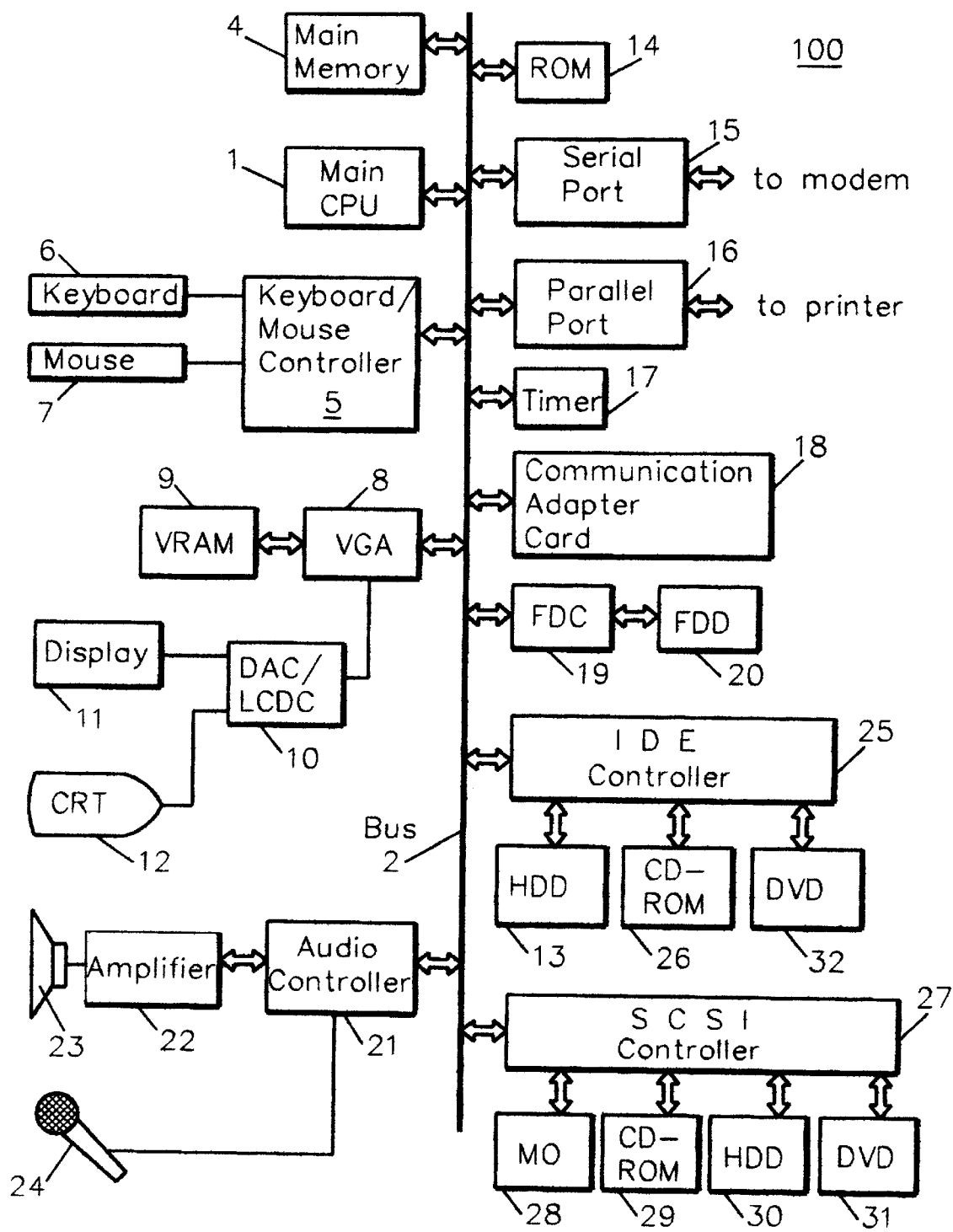
FIG. 3 is a diagram illustrating an example hardware arrangement for a search system according to the present invention.

In FIG. 3 is shown an example hardware arrangement for a search system according to the present invention. A system 100 comprises a central processing unit (CPU) 1 and a memory 4. The CPU 1 and the memory 4 are connected by a bus 2 and an IDE controller 25 to a hard disk drive 13 (or to a storage medium drive, such as an MO, a CD-ROM 26 or a DVD 32), which is an auxiliary storage device. Similarly, the CPU 1 and the memory 4 are connected by the bus 2 and a SCSI controller 27 to a hard disk drive 30 (or to a storage medium drive, such as an MO 28, a CD-ROM 29 or a DVD 31), which is an auxiliary storage device. A floppy disk drive 20 is connected to the bus 2 via a floppy disk controller 19.

A floppy disk is inserted into the floppy disk drive 20. Code or data for a computer program that interacts with an operating system and issues instructions to the CPU 1 to implement the present invention can be stored on the floppy disk or on the hard disk drive 13 (or on a storage medium, such as the MO, the CD-ROM 26 or the DVD 32), and in a ROM 14. This computer program is executed by loading it into the memory 4. The code for the computer program (an OS, a search program, etc.) can be compressed, or can be divided into a plurality of segments for storage on a plurality of storage mediums.

The system 100 further comprises user interface hardware components such as a pointing device (a mouse or a joystick) 7 and a keyboard 6 for entering data, and a display device 12 for providing a search request sentence and search result data for a user. Furthermore, a printer can be connected to the system 100 via a parallel port 16, or a modem can be connected via a serial port 15. For communicating with another computer, the system 100 can be connected to a network via the serial port 15 and a modem, or via a communication adaptor 18 (an ethernet or a token ring card). Preferably, a search request sentence is received via the communication adaptor 18, and the results of the search are transmitted via the communication adaptor 18. A remote transceiver is connected to the serial port 15, or to the parallel port 16, for exchanging data with the system 100 using infrared rays or wires.

A loudspeaker 23 is used to receive, via an amplifier 22, an audio signal obtained by a DIA conversion (digital/analog conversion) performed by an audio controller 21, and to output the signal as sound. The audio controller 21 performs the A/D (analog/digital) conversion of audio information received via a microphone 24 in order to introduce external audio data into the system 100.

As is described above, it would be easily understood that the system of the present invention can be provided by a normal personal computer (PC); a workstation, a notebook PC, a palmtop PC, a network computer, a television set or another electric home appliance that incorporates a computer; a game machine having a communication function; a communication terminal having a communication function, such as a telephone, a facsimile machine, a portable telephone, a PHS or a PDA; or a combination of the components described above. It should be noted, however, that these components are merely examples and not all of them are requisite for the present invention.

According to the present invention, a search that reflects syntactic data can be performed, which is a difficult operation when using the conventional search method. The method of the present invention provides a matching sequence that is considerably faster than is that provided by a method that fully employs syntactic analysis (i.e., by a system that performs all matching by using a syntactic tree). In addition, the inventive method is more accurate than is that employed for a method that involves the use of location constraint data for a single keyword. In addition, to resolve the current shortcoming of an Internet search wherein an excessive number of results are obtained, a search method can be provided according to which a balance can be attained between speed and accuracy.

The invention has been described with reference to several specific embodiments. One having skill in the relevant art will recognize that modifications may be made without departing from the spirit and scope of the invention as set forth in the appended claims.

Having thus described our invention, what I claim as new and desire to secure by Letters Patent is:

1. A search system for searching for a query sentence in a document to be retrieved, comprising:
   at least one analysis component means for analyzing said query sentence;
   at least one extraction component for extracting location constraint data from the results of said analysis to provide a partial-order relationship; and
   at least one search component for searching said document, without performing an analysis of said document, for sentences that match said partial-order relationship.

2. The search system according to claim 1, wherein said at least one search component comprises means for finding a sentence having a higher similarity in a sentence having a shorter context that matches said partial-order relationship.

3. The search system according to claim 1, wherein said at least one analysis component means comprises syntactic tree analysis means for syntactically analyzing said query sentence.

4. A search system on a network, for searching for a query sentence in a document to be retrieved, comprising:
   a receiving component for receiving said query sentence across said network;
   at least one analysis component for analyzing said query sentence;
   at least one extraction component for extracting location constraint data, as a partial-order relationship, from the results of said analysis;
   at least one search component for searching said document for sentences that match said partial-order relationship without analyzing said document; and
   transmitting means for transmitting the result of the search.

5. The search system according to claim 4, wherein said at least one search component, in a process for extracting from said document sentences that match said partial-order relationship, comprises means for finding a sentence having a higher similarity wherein said sentence has a shorter context matching said partial-order relationship.

6. The search system according to claim 4, wherein said at least one analysis component comprises a syntactic tree analysis component for syntactically analyzing said query sentence.

7. A search method for searching for a query sentence in each of a plurality of documents to be retrieved, comprising the steps of:
   analyzing said query sentence;
   extracting location constraint data, as a partial-order relationship, from the results of said analysis; and
   searching each said document, without performing an analysis of said document, for sentences that match said partial-order relationship.

8. The search method according to claim 7, wherein said searching, in a process for extracting from each said document sentences that match said partial-order relationship, comprises finding a sentence having a higher similarity in a sentence having a shorter context that matches said partial-order relationship.

9. The method of claim 7 wherein said query is communicated along a network further comprising the steps of:
   searching said plurality of documents;
   identifying at least one document which satisfies said search; and
   transmitting the result of said search along said network.

10. The search method according to claim 7, wherein said analyzing comprises performing syntactic tree analysis on said query sentence.

11. A computer readable medium, tangibly embodying a program of instructions executable by the machine to perform method steps for searching for a query sentence in a document to be retrieved, said method steps comprising:
    analyzing said query sentence;
    extracting location constraint data, as a partial-order relationship, from the results of said analysis; and
    searching said document, without performing an analysis of said document, for sentences that match said partial-order relationship.

12. The medium according to claim 11, wherein said function for analyzing comprises a syntactic tree analysis function.

* * * * *